US008644409B2

(12) United States Patent
Gorokhov et al.

(10) Patent No.: US 8,644,409 B2
(45) Date of Patent: Feb. 4, 2014

(54) METHOD AND APPARATUS FOR MODULATION AND LAYER MAPPING IN A WIRELESS COMMUNICATION SYSTEM

(75) Inventors: Alexei Y. Gorokhov, San Diego, CA (US); Juan Montojo, San Diego, CA (US); Xiaoxia Zhang, San Diego, CA (US); Peter Gaal, San Diego, CA (US); Xiliang Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 967 days.

(21) Appl. No.: 12/702,158

(22) Filed: Feb. 8, 2010

(65) Prior Publication Data
US 2010/0202561 A1 Aug. 12, 2010

Related U.S. Application Data

(60) Provisional application No. 61/151,781, filed on Feb. 11, 2009, provisional application No. 61/162,271, filed on Mar. 21, 2009.

(51) Int. Cl.
*H04B 7/02* (2006.01)
(52) U.S. Cl.
USPC ........... 375/267; 375/219; 375/220; 375/221; 375/222; 375/224; 375/226; 375/260; 375/295; 375/299; 375/316; 375/340; 375/347; 455/101; 455/132; 455/500; 455/562.1; 370/334; 370/464; 370/480; 341/173; 341/180
(58) Field of Classification Search
None
See application file for complete search history.

(56) References Cited

U.S. PATENT DOCUMENTS

| | | | |
|---|---|---|---|
| 7,120,199 B2* | 10/2006 | Thielecke et al. | 375/267 |
| 7,961,810 B2* | 6/2011 | Varadarajan et al. | 375/295 |
| 7,995,671 B2 | 8/2011 | Kim et al. | |
| 8,184,726 B2* | 5/2012 | Hsiao et al. | 375/260 |
| 2007/0189151 A1 | 8/2007 | Pan et al. | |
| 2007/0223618 A1* | 9/2007 | Jeong et al. | 375/267 |

FOREIGN PATENT DOCUMENTS

| | | |
|---|---|---|
| EP | 1830507 A2 | 9/2007 |
| TW | 571525 B | 1/2004 |
| WO | WO2008056928 A2 | 5/2008 |
| WO | 2008098225 A2 | 8/2008 |

OTHER PUBLICATIONS

International Search Report and Written Opinion—PCT/US2010/023932—International Search Authority, European Patent Office, Feb. 10, 2011.
Taiwan Search Report—TW099104202—TIPO—Jun. 7, 2013.

* cited by examiner

*Primary Examiner* — Leon Flores
(74) *Attorney, Agent, or Firm* — Liem T. Do

(57) ABSTRACT

Systems and methodologies are described herein that facilitate improved modulation and coding techniques for a multiple-in multiple-out (MIMO) communication system. As described herein, data to be transmitted over a set of physical layers (e.g., corresponding to antennas, beams, etc.) can be processed such that encoding is performed on a per-codeword basis and modulation is performed on a per-layer basis, thereby mitigating performance degradation experienced by traditional systems due to layer imbalance. As further described herein, per-codeword code rate parameters and per-layer modulation parameters can be signaled to a device in various manners, such as through modulation and coding scheme (MCS) signaling, explicit code rate and/or modulation scheme signaling, relative code rate and/or modulation scheme signaling, or the like.

50 Claims, 12 Drawing Sheets

METHOD AND APPARATUS FOR MODULATION AND LAYER MAPPING IN A WIRELESS COMMUNICATION SYSTEM

CROSS-REFERENCE

This application claims the benefit of U.S. Provisional Application Ser. No. 61/151,781, filed Feb. 11, 2009, and entitled "Single Codeword with Different Modulation for Different Layers," and U.S. Provisional Application Ser. No. 61/162,271, filed Mar. 21, 2009, and entitled "UPLINK SINGLE USER MULTIPLE-INPUT MULTIPLE-OUTPUT (SU-MIMO) SYSTEMS." The entireties of these applications are incorporated herein by reference.

BACKGROUND

I. Field

The present disclosure relates generally to wireless communications, and more specifically to techniques for conducting modulation and spatial layer mapping for information conveyed within a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Various wireless communications devices can be configured to utilize Single-User MIMO (SU-MIMO) and/or other suitable communication schemes for communication within an associated network environment. For example, in the event that a wireless communications device has multiple antennas, the device can be configured to transmit data to an associated network according to SU-MIMO via a set of spatial layers that correspond to, e.g., physical antennas, beams and/or other appropriate constructs defined across physical antennas, or the like.

Conventionally, common modulation is applied to information transmitted by a given device pursuant to SU-MIMO. However, it can be appreciated that when a quality imbalance between respective layers is present (e.g., due to antenna quality imbalance or the like), performance degradation can result due to the unbalanced reliability of communicated information. Accordingly, it would be desirable to implement techniques for facilitating transmission of information across multiple spatial layers with improved reliability.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying one or more outgoing data streams and a set of spatial layers configured for communicating the one or more outgoing data streams; encoding the one or more outgoing data streams based on respective per-stream coding rates associated with the one or more outgoing data streams, thereby obtaining one or more encoded data streams; mapping the one or more encoded data streams to respective spatial layers in the set of spatial layers, thereby obtaining a set of layer-mapped data streams; and modulating the set of layer-mapped data streams based on respective per-layer modulation schemes.

A second aspect described herein relates to a wireless communications apparatus, which can comprise a memory that stores data relating to one or more outgoing data streams and a set of spatial layers configured for communicating the one or more outgoing data streams. The wireless communications apparatus can further comprise a processor configured to encode the one or more outgoing data streams based on respective per-stream coding rates associated with the one or more outgoing data streams to obtain one or more encoded data streams, to map the one or more encoded data streams to respective spatial layers in the set of spatial layers to obtain a set of layer-mapped data streams, and to modulate the set of layer-mapped data streams based on respective per-layer modulation schemes.

A third aspect relates to an apparatus, which can comprise means for encoding respective data streams based on corresponding per-stream code rate parameters associated with the respective data streams to obtain respective encoded data streams; means for mapping the respective encoded data streams to a set of spatial layers to obtain respective layer-mapped data streams; and means for modulating the respective layer-mapped data streams based on corresponding per-layer modulation parameters.

A fourth aspect described herein relates to a computer program product, which can include a computer-readable medium that comprises code for causing a computer to encode respective data streams based on corresponding per-stream code rate parameters associated with the respective data streams to obtain respective encoded data streams; code for causing a computer to map the respective encoded data streams to a set of spatial layers to obtain respective layer-mapped data streams; and code for causing a computer to modulate the respective layer-mapped data streams based on corresponding per-layer modulation parameters.

According to a fifth aspect, a method is described herein that can comprise identifying an associated network device, one or more codewords associated with a communication scheme utilized by the associated network device, and respective spatial layers employed by the associated network device; defining respective per-layer modulation parameters and per-codeword code rate parameters corresponding to the associated network device; and signaling the respective per-layer modulation parameters and per-codeword code rate parameters to the associated network device.

A sixth aspect described herein relates to a wireless communications apparatus, which can comprise a memory that stores data relating to a network device, one or more codewords associated with a communication scheme utilized by the network device, and respective spatial layers employed by the network device. The wireless communications apparatus can further comprise a processor configured to define respective per-layer modulation parameters and per-codeword code rate parameters corresponding to the network device and to signal the respective per-layer modulation parameters and per-codeword code rate parameters to the network device.

A seventh aspect relates to an apparatus, which can comprise means for defining a set of per-layer modulation parameters and a set of per-codeword coding rate parameters for a designated network device and means for signaling the set of per-layer modulation parameters and the set of per-codeword coding rate parameters to the designated network device.

An eighth aspect described herein relates to a computer program product, which can include a computer-readable medium that comprises code for causing a computer to define a set of per-layer modulation parameters and a set of per-codeword coding rate parameters for a designated network device and code for causing a computer to signal the set of per-layer modulation parameters and the set of per-codeword coding rate parameters to the designated network device.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
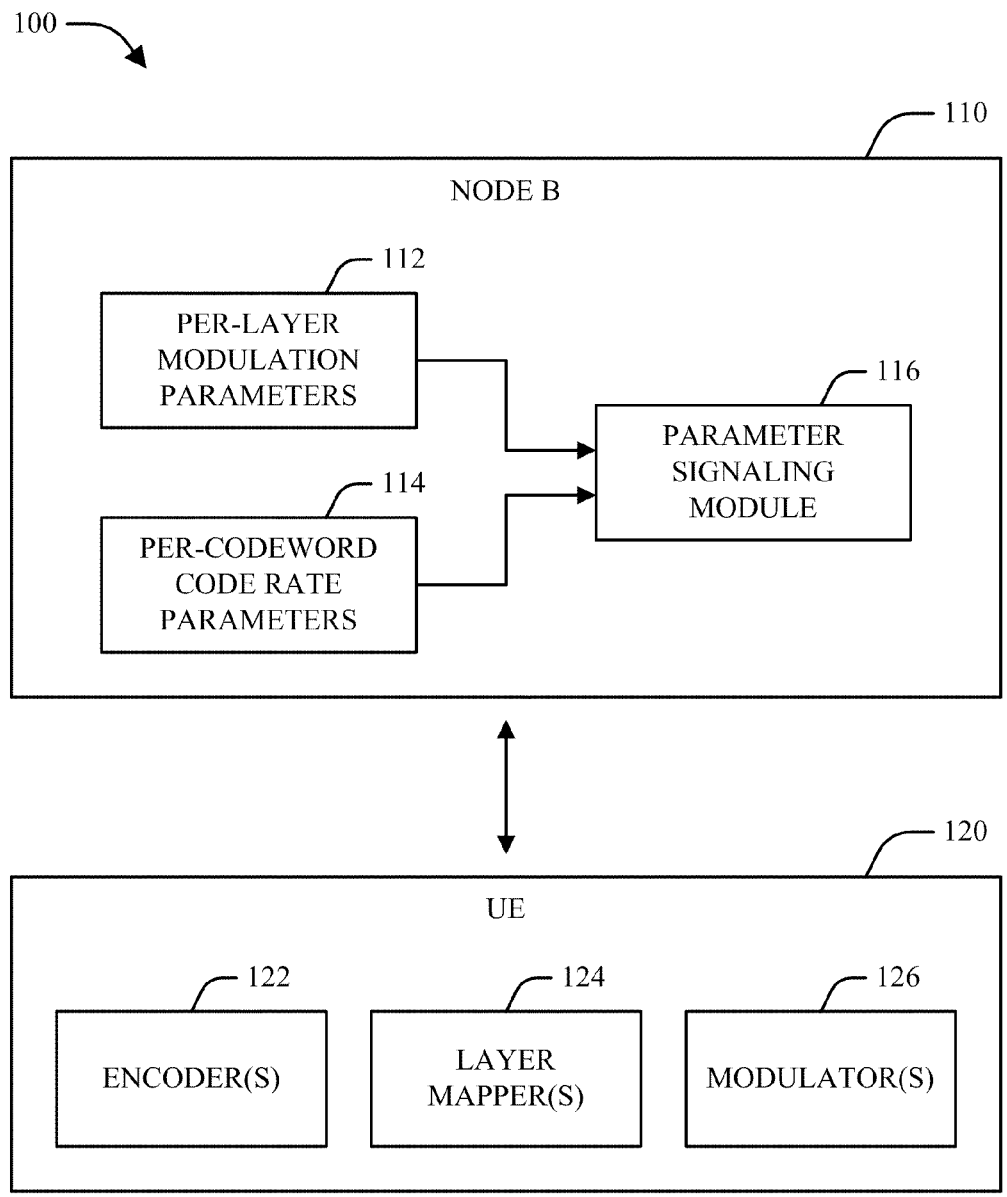
FIG. 1 is a block diagram of a system for coordinating per-codeword encoding and per-layer modulation for information communicated within a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 for coordinating per-codeword encoding and per-layer modulation for information communicated within a wireless communication system in accordance with various aspects described herein. As FIG. 1 illustrates, system 100 can include one or more Node Bs (also referred to herein as network cells, base stations, access points (APs), Evolved Node Bs (eNBs), etc.) 110, which can communicate with one or more user equipment units (UEs; also referred to herein as access terminals (ATs), mobile terminals, etc.) 120. For example, UE 120 can engage in one or more uplink (UL, also referred to herein as reverse link (RL)) communications with Node B 110, and similarly Node B 110 can engage in one or more downlink (DL, also referred to herein as forward link (FL)) communications to UE 120. Additionally or alternatively, Node B 110 and/or UE 120 can engage in any suitable communication(s) with each other, with other devices or entities in system 100, and/or any other suitable entities.

In accordance with one aspect, UE 120 can utilize a multi-rank multi-antenna transmission scheme and/or other suitable transmission schemes for communication with Node B 110 and/or other network entities. For example, UE 120 can utilize one or more encoders 122, layer mappers 124, and/or modulators 126 to prepare information for transmission within system 100. In one example, transmissions can be conducted by UE 120 using one or more codewords (e.g., up to 2 codewords). Additionally or alternatively, layer shifting (or layer permutation) can be utilized by UE 120 to allow for spatial bundling of Hybrid Automatic Repeat Request (HARM) parameters and/or other suitable parameters. For example, by using layer shifting in the time domain, respective codewords can be configured to span multiple layers over time. When a codeword spans multiple layers, it can be appreciated that the codeword can benefit from spatial diversity. However, it can further be appreciated that layer shifting as performed in this manner can introduce performance loss, such as, for example, when the multiple layers have strong signal-to-noise ratio (SNR) imbalance. Accordingly, to mitigate this performance loss and/or to achieve other appropriate ends, Node B 110 and UE 120 can operate as described herein to overcome the effects associated with SNR imbalance among respective layers.

Figure 2:
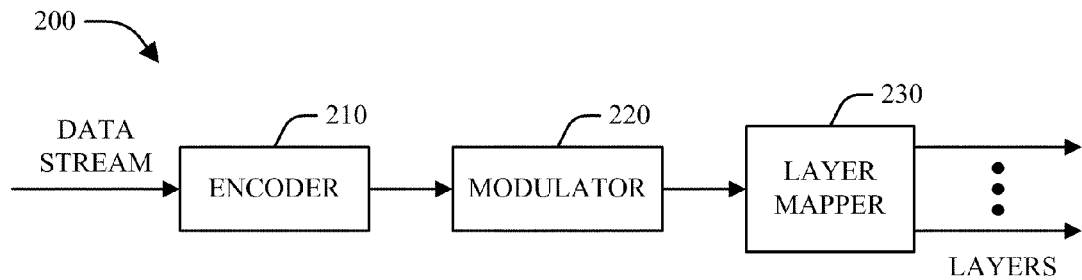
FIGS. 2-3 are block diagrams that illustrate various systems for preparing data for communication according to a single codeword transmission scheme in accordance with various aspects.

Conventionally, a modulation and coding scheme (MCS), which can include information relating to a code rate, modulation order, etc., is associated with respective streams (e.g., streams of coded data). Assignments of MCS can be made on a per-codeword basis, such that, for example, a single codeword system utilizes one stream and one corresponding MCS and a multi-codeword system utilizes multiple streams and corresponding MCSs. Further, based on information provided by a MCS for a given stream, the stream can be associated with the specified MCS (e.g., via modulation and coding according to the MCS). Subsequently, codeword to layer mapping can be performed to map respective processed codewords to a set of spatial layers (corresponding to, for example, physical antennas, beams formed via beamforming and/or other processes across multiple physical antennas, etc.). Layer-mapped data can then be fed to the antenna(s) corresponding to the respective spatial layers for transmission. An example of the above is illustrated for a single-codeword system by system 200 in FIG. 2. As shown in FIG. 2, an outgoing data stream can be processed by an encoder 210 and a modulator 220, which can utilize a common MCS for all layers corresponding to the data stream prior to performing layer mapping via layer mapper 230. In one example, layer mapper 230 can map data corresponding to respective codewords by, for example, rotating the codewords across the associated set of spatial layers.

It can be appreciated that a common modulation scheme, such as that shown by system 200, effectively conveys the same amount of coded bits over each associated layer. Further, it can be appreciated that such a scheme can provide reasonable performance provided that adequate coding and interleaving are utilized and respective layers are relatively balanced in quality. However, if a substantial quality imbalance is present between layers associated with layer mapper 230, it can be appreciated that a common modulation scheme as illustrated by system 200 can suffer from performance degradation due to unbalanced reliability of respective demodulated coded bits.

More particularly, it can be appreciated that respective spatial layers associated with a mobile device and/or other suitable communications device can experience a substantial offset in SNR, signal-to-interference-plus-noise ratio (SINR), and/or other quality metrics for various reasons. For example, in the event that antennas associated with a mobile device are not equal in power, quality, and/or other factors (e.g., such as when a mobile device utilizes an external antenna with a substantially large gain and an internal antenna with a smaller gain), application of the same power amplifier (PA) parameters to each associated antenna will result in differing values of received energy at a Node B and/or other receiving entity from the respective antennas due to the differing gains and/or other imbalance between the antennas.

As another example, in the event that uplink and/or downlink beamforming is conducted via eigen-beamforming, a channel matrix associated with a mobile device can be processed using eigen decomposition to obtain, for example, a principal eigen-component and one or more secondary eigen-components. It can be appreciated that, due to varying antenna strength, antenna correlation, and/or other factors, a significant degree of variability can be present between the eigen-components such that the principal eigen-component is stronger than the secondary eigen-component(s). Accordingly, signal imbalance can be present in a scenario in which spatial layers are mapped to respective beams in a similar manner to the scenario described above relating to layer/antenna mappings.

In order to maximize the performance of a mobile device and its respective associated antennas, it can be appreciated that increased performance results when modulation orders for a mobile device are chosen in a consistent manner with SINR. For example, it can be appreciated that selecting a modulation order that is relatively low for a high SINR can result in transmission efficiency below that which is supported by the observed channel strength. Similarly, it can be appreciated that selecting a modulation order that is relatively high for a low SINR can result in reduced coding efficiency. By way of specific example, if the spectral efficiency supported on a given stream is 1 bit/second/Hz and a quadrature amplitude modulation (QAM) constellation such as 64-QAM is used (corresponding to 6 bits per channel use), a coding rate of 1/6 would be required to avoid exceeding the spectral efficiency of the channel. However, if a coding scheme generally associated with a code rate higher than 1/6 is utilized (e.g., a turbo encoder with rate 1/3), repetition coding and/or other means for lowering the code rate can in some cases be required in order to provide the code rate necessary for the associated channel based on the modulation order, thereby adversely impacting communication performance.

Returning to FIG. 1, in accordance with one aspect UE 120 can overcome at least the shortcomings of conventional MIMO procedures as illustrated above by utilizing per-codeword coding and per-layer modulation as described herein. For example, UE 120 can identify one or more outgoing data streams (e.g., corresponding to a single codeword transmission scheme and/or a multi-codeword transmission scheme) and a set of spatial layers (e.g., corresponding to respective associated antennas, respective beams defined across a plurality of associated antennas, etc.) that are configured for communicating the one or more outgoing data streams. Next, UE 120 can then utilize one or more encoders 122 to encode the one or more outgoing data streams based on respective per-stream coding rates associated with the one or more outgoing data streams in order to obtain respective encoded data streams. One or more encoded data streams generated by encoder 122 can then be mapped (e.g., by layer mapper(s) 124 or the like) to respective spatial layers in an associated set of spatial layers in order to obtain a set of layer-mapped data streams. Finally, the set of layer-mapped data streams can be modulated (e.g., via modulator(s) 126) based on respective per-layer modulation schemes.

Figure 3:
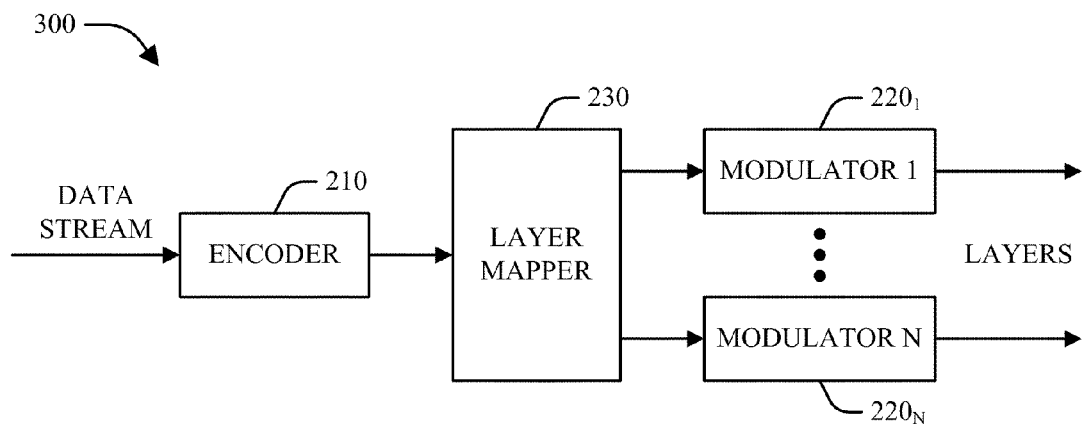

An example implementation of the above data stream processing procedure for a single codeword transmission scheme is illustrated by system 300 in FIG. 3. As shown in system 300, an outgoing data stream can be processed by an encoder 210, after which layer mapping can be performed by a layer mapper 230 prior to per-layer modulation by modulators 220. Accordingly, in contrast to system 200 in FIG. 2, it can be appreciated that system 300 enables the employment of different modulation schemes over different spatial layers, thereby mitigating performance degradation due to unbalanced layer reliability as described above. By way of specific example, in a two-layer system where a first layer is significantly stronger than a second layer, system 300 enables the use of higher-order modulation for the first layer and lower-order modulation for the second layer. In this way, it can be appreciated that the corresponding coded bits can be demodulated with balanced reliability at the receiver.

With reference again to FIG. 1, UE 120 in system 100 can receive respective per-stream or per-codeword coding rates, per-layer modulation schemes, and/or other related information from Node B 110 and/or another associated network entity. Such information can be provided in an uplink grant message from Node B 110 and/or within any other suitable signaling within system 100. In accordance with one aspect, Node B 110 can determine respective parameters for use by one or more UEs 120 in the following manner. Initially, Node B 110 can identify an associated UE 120 and/or other suitable network device, one or more codewords associated with a communication scheme utilized by UE 120, and respective spatial layers employed by UE 120 (e.g., corresponding to at least one of respective antennas at UE 120 or beams defined across a plurality of antennas at UE 120). Node B 110 can then define respective per-layer modulation parameters 112 and per-codeword code rate parameters 114 corresponding to UE 120 and signal the respective per-layer modulation parameters 112 and per-codeword code rate parameters 114 to UE 120 (e.g., using a parameter signaling module 116 and/or other suitable means). In one example, parameter signaling module 116 can convey per-layer modulation parameters 112 and/or per-codeword code rate parameters 114 to UE 120 in an uplink grant message to UE 120.

In accordance with one aspect, Node B 110 and/or another suitable entity within system 100 can operate to determine per-layer modulation parameters 112 and/or per-codeword code rate parameters 114 for one or more UEs 120 in various manners as described herein. While various examples of techniques that can be utilized to obtain parameters corresponding to a UE 120 are provided herein, it should be appreciated that such examples are not intended to limit the scope of the subject matter claimed herein and that, unless explicitly stated otherwise, the hereto appended claims are not intended to require any specific technique or combination of techniques.

By way of a first specific, non-limiting example involving a single codeword transmission and a set of two physical layers (herein referred to as layer or physical layer 1 and layer or physical layer 2) onto which the codeword is to be mapped, respective per-layer modulation parameters 112 and/or per-codeword code rate parameters 114 can be determined in the following manner. Initially, let $SNR_1$ denote the signal-to-noise ratio for physical layer 1 and $SNR_2$ denote the signal-to-noise ratio for physical layer 2. Next, in order to determine modulation orders to be utilized on the respective physical layers, the following approach can be applied. First, an associated MCS table (e.g., as generated in various manners generally known in the art) can be checked for $SNR_1$ to find a corresponding modulation order $Q_1$ and transport block (TB) size $C_1$, such that modulation order $Q_1$ can be used for layer 1. Next, the MCS table can be checked for $SNR_2$ to find a corresponding modulation order $Q_2$ and TB size $C_2$, such that modulation order $Q_2$ can be used for layer 2.

Based on the above, the effective TB size can be determined from $C_1$ and $C_2$ as follows. When both layer 1 and layer 2 are simultaneously employed to deliver a codeword (e.g., in the single codeword case), the effective TB size can be expressed as $C_{eff}=(C_1+C_2)$. Alternatively, when layer 1 and layer 2 are used to deliver coded bits from a codeword in an alternating fashion, if it is assumed that layer 1 is active for a fraction $f_1$ fraction of the total time to transport the codeword and layer 2 is active for a fraction $f_2$ fraction of the total time to transport the codeword, the effective TB size can be expressed as follows: $C_{eff}=(round)(f_1 \times C_1 + f_2 \times C_2)/(f_1+f_2)$. In addition, if $N_{s1}$ is used to denote the total number of modulation symbols available for sending the codeword on physical layer 1 and $N_{s2}$ is used to denote the total number of modulation symbols available for sending the codeword on physical layer 2, the final number of rate-matched bits can be expressed as $N_{s1} \times Q_1 + N_{s2} \times Q_2$.

Figure 4:
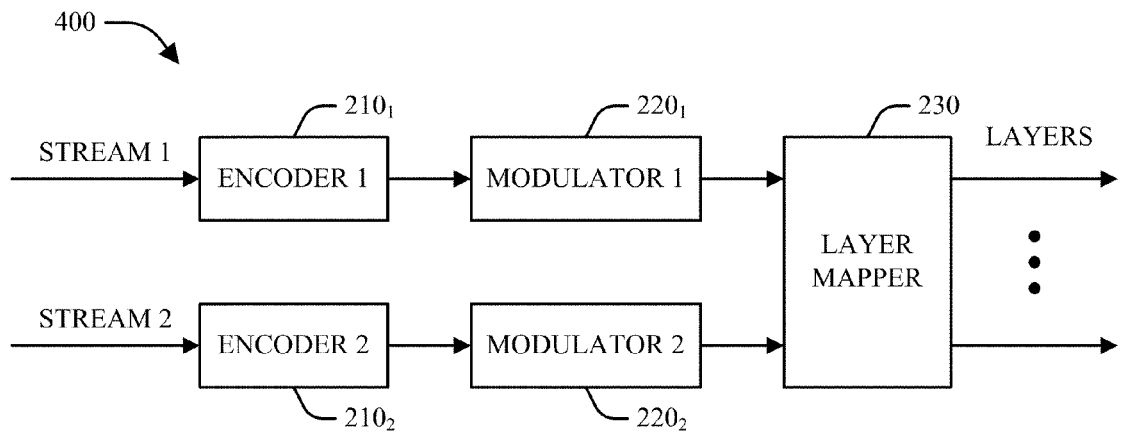
FIGS. 4-5 are block diagrams that illustrate various systems for preparing data for communication according to a multi-codeword transmission scheme in accordance with various aspects.
Figure 5:
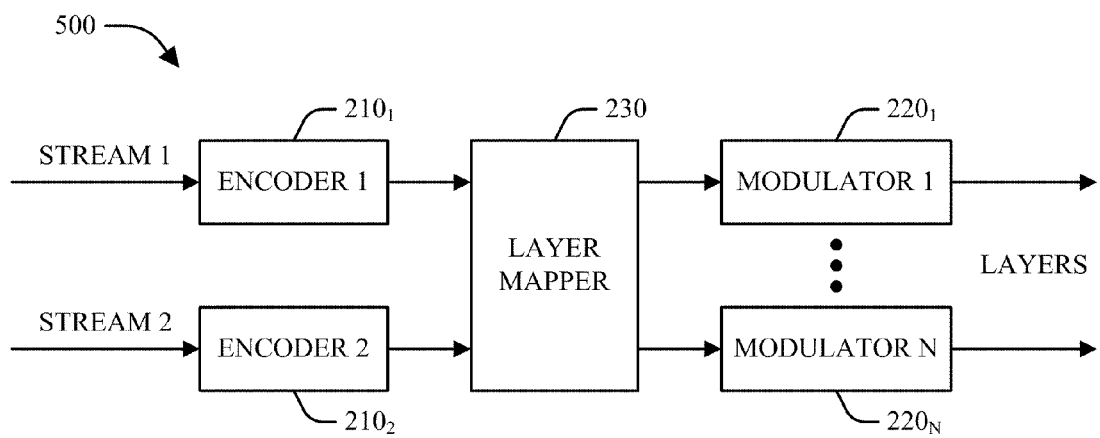

In accordance with another aspect, various techniques described above can be extended to multi-codeword systems in a similar manner to their application to single codeword systems as described above. For example, as illustrated by system 400 in FIG. 4, a multi-codeword transmission scheme can utilize respective encoders 210 for a plurality of outgoing data streams, which can be individually modulated by respective modulators 220 and mapped to a set of spatial layers via a layer mapper 230. Further, to overcome the shortcomings associated with layer signal imbalance as described above, per-layer modulation and per-codeword coding can be applied as shown in system 500 in FIG. 5, wherein layer mapping via layer mapper 230 occurs prior to modulation via respective per-layer modulators 220. While systems 400-500 illustrate systems that utilize two data streams and two corresponding codewords, it should be appreciated that the techniques described herein can be extended to systems utilizing any number of data streams and/or codewords.

In the specific case of multi-codeword transmission, an associated receiver can in some cases be a successive cancellation receiver and/or another suitable receiver configured to attempt decoding of a first codeword and, if successful, re-encode the first codeword and subtract the first codeword from the received signal in order to obtain the second codeword. Accordingly, it can be appreciated that the second codeword can be received with higher quality due to the fact that upon decoding the first codeword it effectively acts as interference with respect to the second codeword, which can be removed to improve the quality of the second codeword. For this reason, it can further be appreciated that different MCSs are often applied to respective codewords in a multi-codeword system, as the codewords are going through effectively differing channels such that a first codeword goes through an effective interference channel due to the subsequent codewords and the subsequent codewords see significantly less interference once the first codeword is removed. However, due to channel fading and/or other factors, layer mapping is conventionally applied to respective codewords despite the successive cancellation gains noted above. Accordingly, it can be appreciated that multi-codeword schemes can benefit from the techniques described herein in a similar manner to single codeword schemes.

With reference again to FIG. 1, it can be appreciated that, in order to enable per-layer modulation and per-codeword coding as generally described herein, Node B 110 can convey (e.g., via an uplink grant) code rates for respective codewords as well as modulation schemes to be applied to respective layers to UE 120. In one example, this can be accomplished by direct signaling of the overall coding rate and modulation schemes for substantially all layers, by signaling sufficient information such that the overall coding rate and modulation schemes for each layer can be derived, and/or in any other suitable manner. To fulfill these ends, signaling information can be encoded in messaging from Node B 110 to UE 120 in one or more of the following manners. It should be appreciated, however, that the following description is intended merely by way of example and that the claimed subject matter is not intended to be limited to specific examples unless stated otherwise.

In a first example, individual M-bit MCS indices can be transmitted for each layer utilized by UE 120 for an integer M (e.g., 5). In such an example, MCS indices transmitted to a UE 120 can be based on existing MCS tables.

In a second example, an M-bit MCS index can be transmitted to indicate a coding rate and modulation scheme for a strongest layer in combination with an S-bit strongest layer index. In one example, the number of bits S used for the strongest layer index can be represented by $ceil(log_2(NumberOfLayers))$, where $ceil(\ )$ represents the ceiling operation. Alternatively, a strongest layer index can be omitted by providing an M-bit MCS index indicating the coding rate and modulation scheme for a fixed layer. Additionally, a Q-bit modulation scheme index can be provided for each remaining layer to indicate the modulation schemes for such layers. In one example, the number of bits Q can be equal to $ceil(log_2(NumberOfUplinkModulationSchemes))$. Alternatively, joint coding of the modulation scheme for substantially all remaining layers can be performed. In such an example, MCS indices transmitted to a UE 120 can be based on existing MCS tables.

In a third example, an M-bit MCS index can be transmitted to indicate a coding rate and modulation scheme for a strongest layer in combination with an S-bit strongest layer index. Alternatively, a strongest layer index can be omitted by providing an M-bit MCS index indicating the coding rate and modulation scheme for a fixed layer. In addition, an N-bit delta MCS index can be provided for each remaining layer to indicate the MCS for each remaining layer. In such an example, MCS indices transmitted to a UE 120 can be based on existing MCS tables.

In a fourth example, Node B 110 can signal the effective coding rate for the codeword and modulation schemes used for substantially all layers to UE 120. In one example, the code rate and modulation schemes as transmitted in this manner can be jointly coded.

In accordance with a further aspect, in an example implementation involving multi-codeword transmission, layer shifting can be performed in time domain such that each codeword spans multiple layers over time. As described above, in order to combat SNR imbalance among layers, an uplink grant and/or other signaling from Node B 110 to UE 120 can convey the information to obtain coding rates for each codeword together with modulation orders per layer for each codeword.

In the case of multiple codeword transmission, it can be appreciated that various scenarios can be encountered. For example, if a minimum mean square error (MMSE) receiver and a roughly equal cycle of all layers per codeword is employed, it can be appreciated that substantially all codewords will experience similar effective channel quality over each spatial layer. Accordingly, the multiple codewords can have the same code rate with the same modulation scheme per layer—e.g., the code rate and/or modulation orders for a first codeword (e.g., as signaled in one or more of the manners shown above) can be applied to the other codewords as well.

In another example, if a MMSE receiver is employed but each codeword experiences an unequal cycle of different layers, different effective channel quality can result between the multiple codewords. This can happen if, for example, layer shifting in the time domain is done per Single Carrier Orthogonal Frequency Division Multiplexing (SC-OFDM) symbol, as a limited number of SC-OFDM symbols are present within a sub-frame. In such a case, an uplink grant and/or other suitable signaling from Node B 110 to UE 120 can be configured to enable derivation of various data. This data can include, for example, modulation per layer and code rate per codeword.

Figure 6:
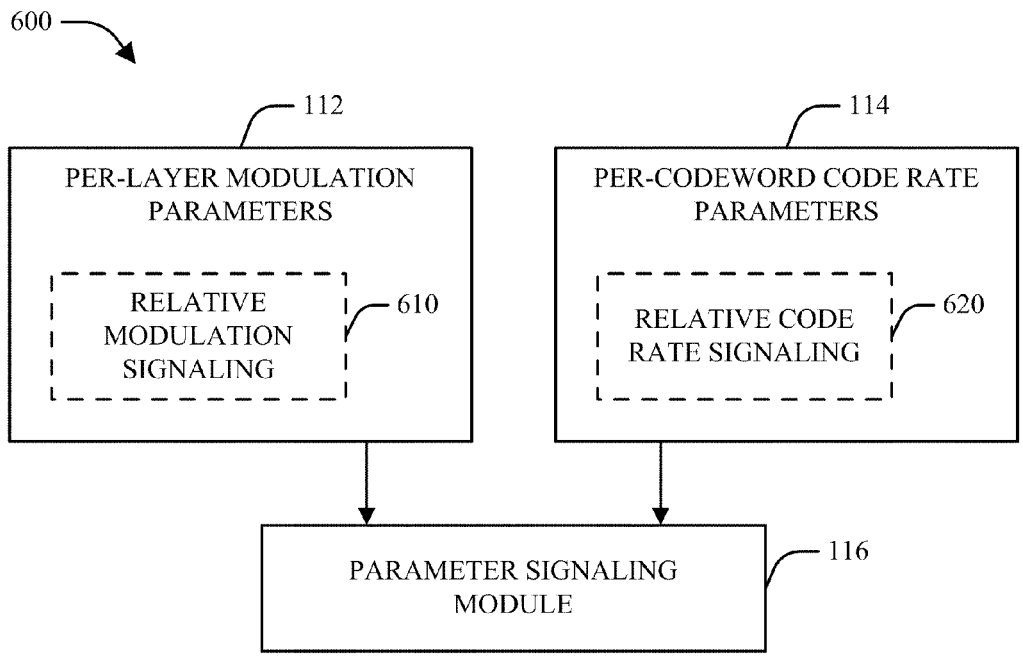
FIGS. 6-7 are block diagrams of respective systems for signaling modulation and coding parameters within a wireless communication system in accordance with various aspects.

In accordance with one aspect, per-layer modulation data and per-codeword code rate data can be signaled in various manners. In a first example, modulation and/or code rate data can be signaled explicitly. An example of this technique is illustrated by system 600 in FIG. 6, wherein per-layer modulation parameters 112 and per-codeword code rate parameters 114 are explicitly signaled via a parameter signaling module 116. As further shown in system 600, per-layer modulation parameters 112 can optionally include reference modulation parameters that indicate a modulation scheme for at least one specified spatial layer (e.g., employed by an associated network device) and relative modulation parameters (e.g., provided in relative modulation signaling 610) for respective spatial layers disparate from the at least one specified spatial layer. Relative modulation signaling 610 provided in this manner can include, for example, respective 1-bit values that indicate a modulation scheme selected from the group consisting of the modulation scheme for the at least one specified spatial layer employed by the network device or a modulation scheme associated with a constellation of a predetermined degree smaller than a constellation associated with the modulation scheme for the at least one specified spatial layer employed by the network device. Thus, by way of illustrated example, in the event that a specified spatial layer utilizes a 64-QAM modulation scheme, 1-bit relative modulation signaling 610 can be utilized to indicate either 64-QAM or 16-QAM. In another example illustrated by system 600, per-codeword code rate parameters 114 can optionally include reference code rate parameters for at least one specified codeword (e.g., associated with a communication scheme utilized by an associated network device) and relative code rate parameters (e.g., provided in relative code rate signaling 620) for respective codewords disparate from the at least one specified codeword. In one example, modulation and/or code rate data signaled in the above manners can be jointly coded.

Figure 7:
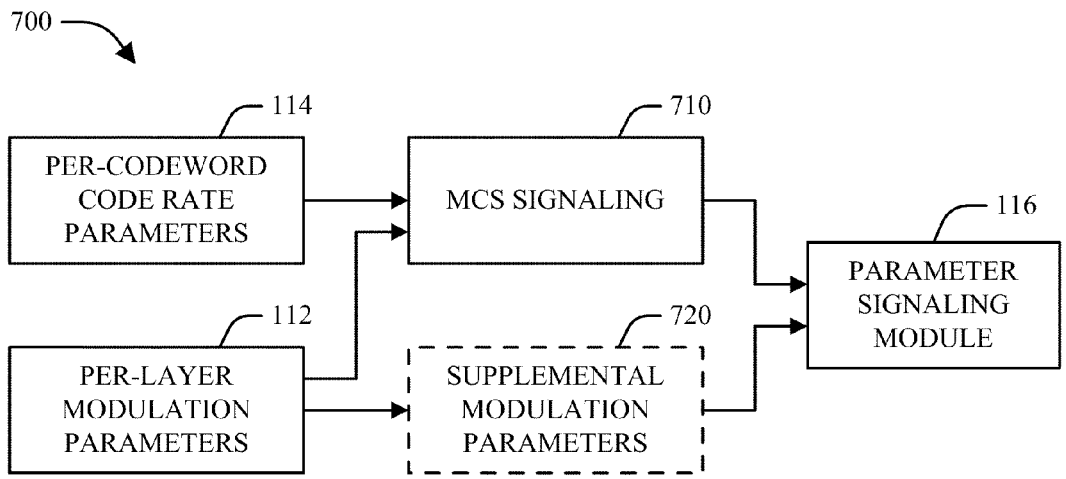

In a second example technique by which per-layer modulation data and per-codeword code rate data can be signaled, existing MCS tables can be reused such that a first MCS ($MCS_1$) can be signaled to indicate a modulation order of a first layer and a code rate of a first codeword and respective additional MCS ($MCS_n$) can be signaled to indicate a modulation order for an n-th layer and a code rate for an n-th codeword. An example of this technique is illustrated by system 700 in FIG. 7. As shown in system 700, MCS information (e.g., MCS signaling 710) that includes per-codeword code rate parameters 114 for at least one codeword (e.g., associated with a communication scheme utilized by a corresponding network device) and per-layer modulation parameters 112 for at least one spatial layer (e.g., employed by the corresponding network device) can be signaled via a parameter signaling module 116 and/or other suitable means. In one example, in the event that the number of layers (m) is larger than the number of codewords (n), (n-m) elements of MCS signaling 710 can be signaled corresponding to the modulation on the remaining (n-m) layers. Alternatively, supplemental modulation parameters 720 can be utilized to signal the modulation orders on the remaining (n-m) layers. For example, parameter signaling module 116 can signal supplemental per-layer modulation parameters with MCS information upon determining that a number of spatial layers employed by an associated network device is greater than a number of codewords associated with a communication scheme utilized by the network device. In one example, supplemental modulation parameters 720 can be jointly coded.

In accordance with a further aspect, if a MMSE-successive interference cancellation (MMSE-SIC) receiver is utilized, different codewords can experience differing effective channel quality even with layer shifting. In such an example, per-layer modulation data and per-codeword coding rate data can be signaled in various manners. In a first example, different MCS can be applied per codeword. In one example, SNR imbalance among different spatial layers within a given codeword can be alleviated by the application of a SIC receiver.

In a second example, respective schemes as described above for a single codeword case can be applied for each codeword such that an uplink grant and/or other signaling contains the information necessary to derive the code rate and modulation per layer for each individual codeword.

In a third example, codewords can share the same modulation schemes per layer and different code rates can be signaled for different codewords. In such an example, signaling can be performed in various manners as described above.

In a fourth example, for a codeword that is to be decoded initially (e.g., before other codewords are cancelled), respective schemes as described above can be utilized, wherein the codeword is modulated with different modulation orders over respective spatial layers. For respective remaining codewords, one MCS per codeword can be utilized, as such codewords will experience less interfered channels with less imbalance due to cancellation.

In accordance with one aspect, modulation order and coding rate information can be generated in various manners. In one example, MCS information can be configured to carry modulation order for a given layer and code rate for a corresponding codeword. Subsequently, supplemental modulation signaling can be provided to indicate per-layer modulation orders for additional layers. Let M denote the modulation order, which corresponds to the number of bits that can be modulated over one constellation point. Thus, for example, QPSK can be associated with M=2, 16-QAM can be associated with M=4, 64-QAM can be associated with M=6, and so on. In one example, by multiplying a modulation order M by a coding rate $r_c$, a spectral efficiency R can be obtained as $R=r_c M$ and/or $R=2r_c M$ in various implementations. For example, $R=r_c M$ can correspond to layer or antenna switching while $R=2r_c M$ can correspond to simultaneous transmission via multiple layers.

In one example, if two layers are employed by an associated device, the above spectral efficiency calculations can be adapted for multiple modulation orders. Thus, spectral efficiency can be calculated as $R=(1/2)r_c(M1+M2)$ and/or $R=r_c(M1+M2)$ in various implementations, wherein M1 and M2 correspond to the modulation orders for layer 1 and layer 2, respectively. Accordingly, MCS signaled in relation to a single codeword scheme can indicate coding rate $r_c$ and modulation order M1 and additional information can be signaled to indicate M2 (e.g., in relation to M1).

Similar techniques can be utilized for a multi-codeword system. For example, in the case of a two-codeword system, spectral efficiencies of each codeword can be expressed as $R1=r1(M1+M2)/2$ and $R2=r2(M1+M2)/2$, where r1 and r2 are the coding rates for codeword 1 and codeword 2, respectively. Accordingly, two MCS signals MCS1 and MCS2 can be provided, such that MCS1 indicates r1 and M1 and MCS2=r2 and M2. Alternatively, MCS1 can indicate r1 and M1, MCS2 can indicate r2 and M1, and additional information can be signaled to indicate M2. Alternatively, information relating to r1, r2, M1, and M2 can be signaled in any other suitable manner.

Figure 8:
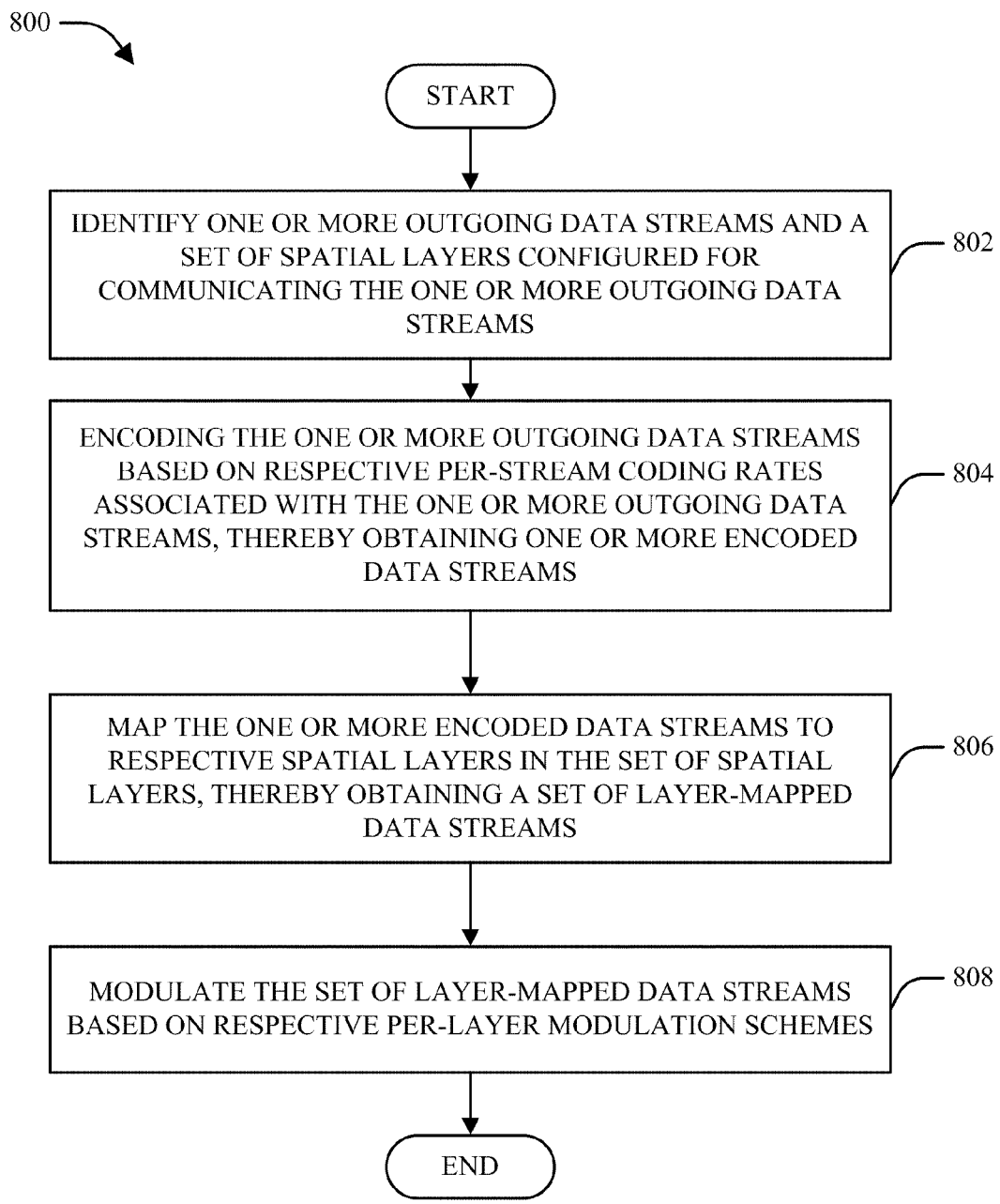
FIG. 8 is a flow diagram of a methodology for generating signals for transmission on respective spatial layers associated with a wireless communications device.
Figure 9:
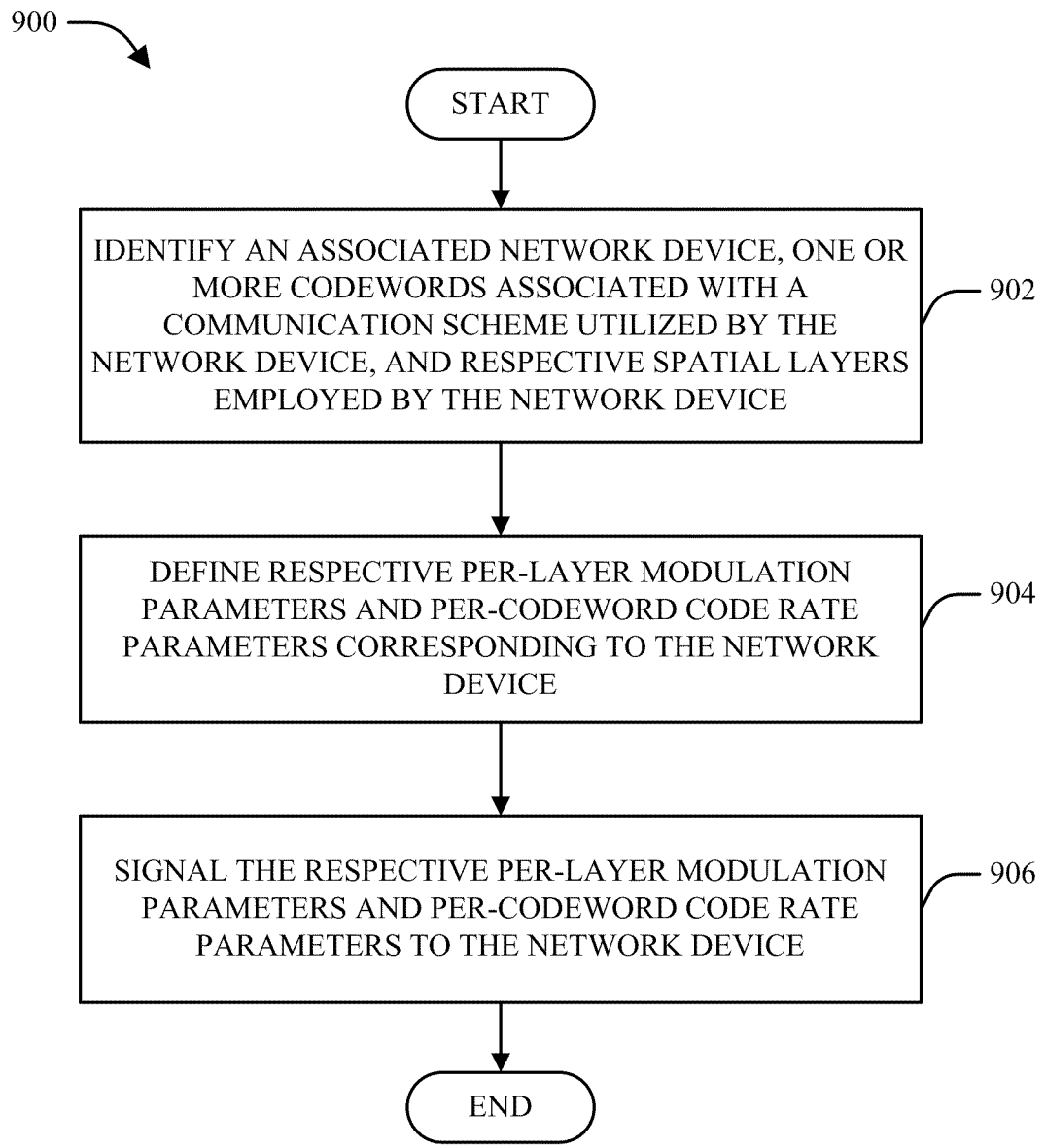
FIGS. 9-10 are flow diagrams of respective methodologies for signaling per-layer modulation information and per-codeword coding information within a wireless communication system.
Figure 10:
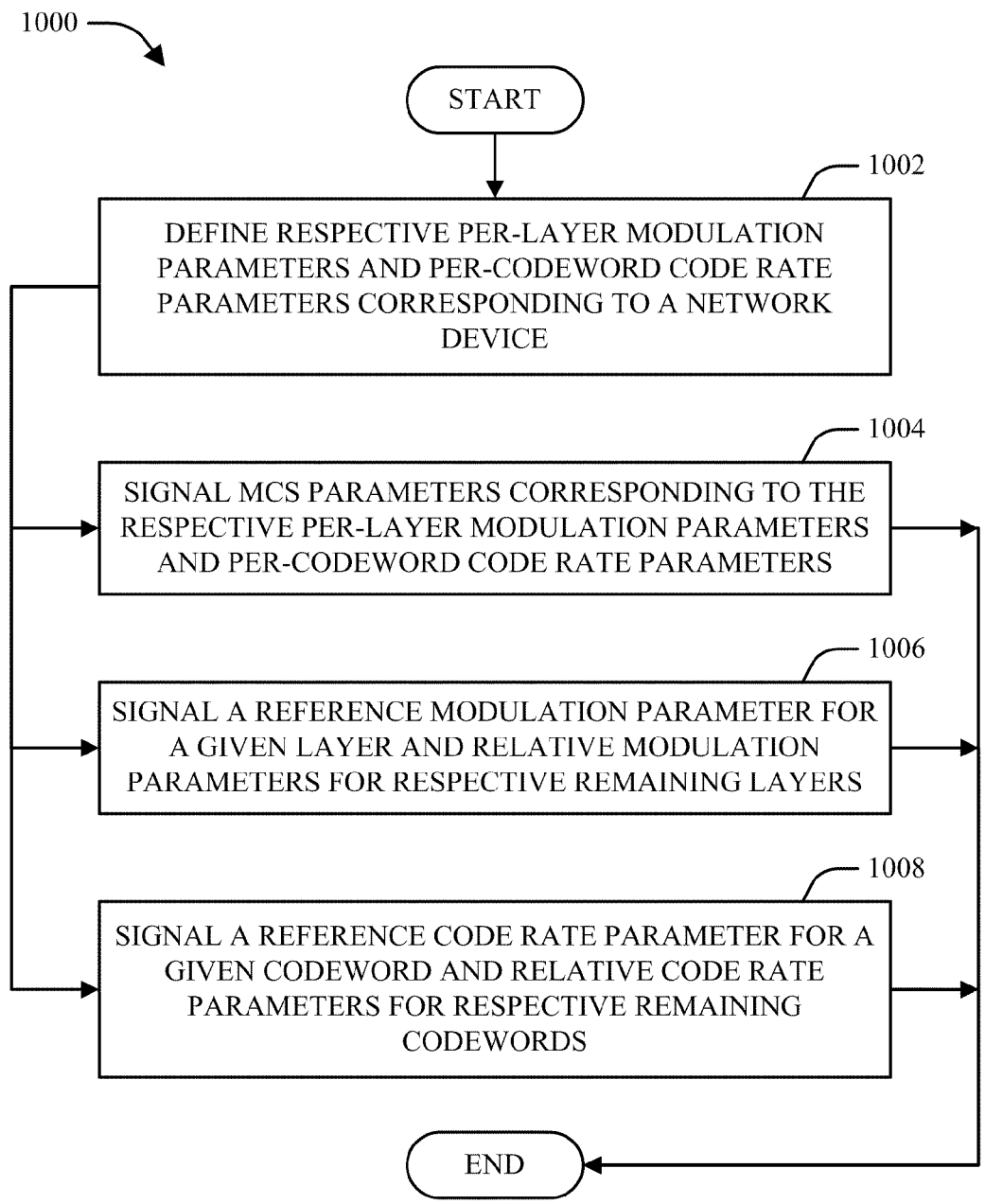

Referring now to FIGS. 8-10, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 8, illustrated is a methodology 800 for generating signals for transmission on respective spatial layers associated with a wireless communications device. It is to be appreciated that methodology 800 can be performed by, for example, a UE (e.g., UE 120) and/or any other appropriate network entity. Methodology 800 begins at block 802, wherein one or more outgoing data streams and a set of spatial layers configured for communicating the one or more outgoing data streams are identified. Next, at block 804, the one or more outgoing data streams are encoded (e.g., via encoder(s) 122) based on respective per-stream coding rates (e.g., per-codeword code rate parameters 114) associated with the one or more outgoing data streams in order to obtain one or more encoded data streams. At block 806, the one or more encoded data streams obtained at block 804 are mapped (e.g., via layer mapper(s) 124) to respective spatial layers in the set of spatial layers identified at block 802 in order to obtain a set of layer-mapped data streams. Methodology 800 can then conclude at block 808, wherein the set of layer-mapped data streams obtained at block 806 is modulated (e.g., via modulator(s) 126) based on respective per-layer modulation schemes (e.g., per-layer modulation parameters 112).

Turning now to FIG. 9, a flow diagram of a methodology 900 for signaling per-layer modulation information and per-codeword coding information within a wireless communication system is illustrated. Methodology 900 can be performed by, for example, a network cell (e.g., Node B 110) and/or any other appropriate network entity. Methodology 900 begins at block 902, wherein an associated network device (e.g., UE 120), one or more codewords associated with a communication scheme utilized by the network device, and respective spatial layers employed by the network device are identified. Next, at block 904, respective per-layer modulation parameters (e.g., per-layer modulation parameters 112) and per-codeword code rate parameters (e.g., per-codeword code rate parameters 114) corresponding to the network device are defined. Methodology 900 can then conclude at block 906, wherein the respective per-layer modulation parameters and per-codeword code rate parameters defined at block 904 are signaled (e.g., via a parameter signaling module 116) to the network device identified at block 902.

FIG. 10 illustrates another methodology 1000 for signaling per-layer modulation information and per-codeword coding information within a wireless communication system. Methodology 1000 can be performed by, for example, an eNB and/or any other suitable network entity. Methodology 1000 begins at block 1002, wherein respective per-layer modulation parameters and per-codeword code rate parameters corresponding to a network device are defined. Upon completing the acts described at block 1002, methodology can subsequently proceed to one or more of block 1004, block 1006, or block 1008 before concluding. At block 1004, MCS parameters are signaled that correspond to the respective per-layer modulation parameters and per-codeword code rate parameters defined at block 1002. At block 1006, a reference modulation parameter for a given layer and relative modulation parameters for respective remaining layers are signaled. At block 1008, a reference code rate parameter for a given codeword and relative code rate parameters for respective remaining codewords are signaled.

Figure 11:
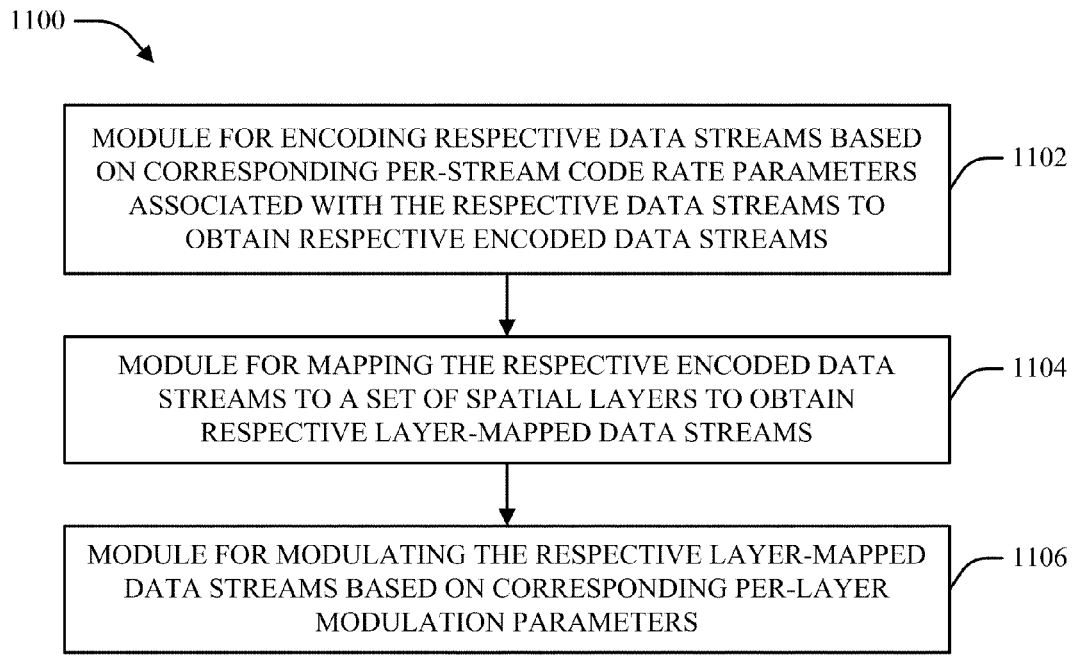
FIGS. 11-12 are block diagrams of respective apparatuses that facilitate improved modulation and layer mapping for data communicated in a wireless communication network.
Figure 12:
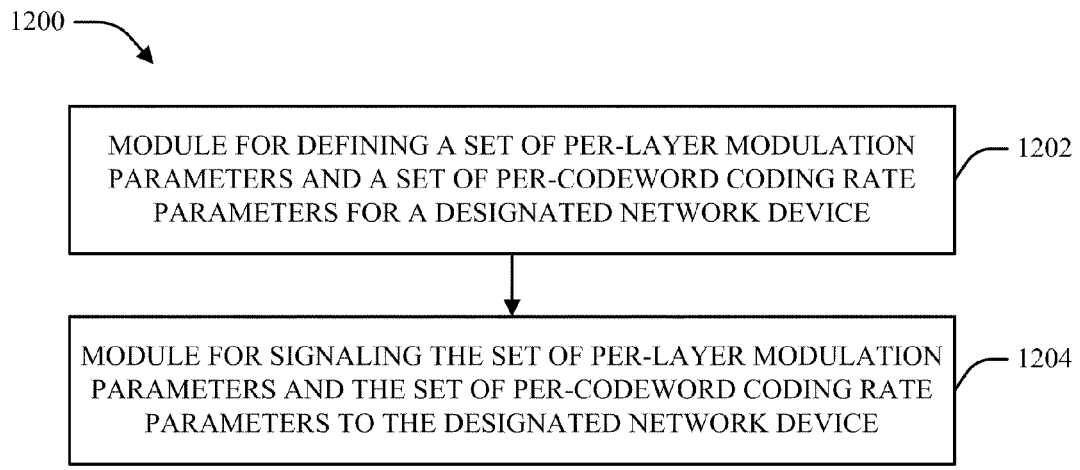

Referring next to FIGS. 11-12, respective apparatuses 1100-1200 that can be utilized to facilitate various aspects described herein are illustrated. It is to be appreciated that apparatuses 1100-1200 are represented as including functional blocks, which can be functional blocks that represent functions implemented by a processor, software, or combination thereof (e.g., firmware).

With reference first to FIG. 11, an apparatus 1100 that facilitates improved modulation and layer mapping for data communicated in a wireless communication network is illustrated. Apparatus 1100 can be implemented by a UE (e.g., UE 120) and/or any other suitable network entity and can include a module 1102 for encoding respective data streams based on corresponding per-stream code rate parameters associated with the respective data streams to obtain respective encoded data streams, a module 1104 for mapping the respective encoded data streams to a set of spatial layers to obtain respective layer-mapped data streams, and a module 1106 for modulating the respective layer-mapped data streams based on corresponding per-layer modulation parameters.

FIG. 12 illustrates another apparatus 1200 that facilitates improved modulation and layer mapping for data communicated in a wireless communication network. Apparatus 1200 can be implemented by a Node B (e.g., Node B 110) and/or any other suitable network entity and can include a module 1202 for defining a set of per-layer modulation parameters and a set of per-codeword coding rate parameters for a designated network device and a module 1204 for signaling the set of per-layer modulation parameters and the set of per-codeword coding rate parameters to the designated network device.

Figure 13:
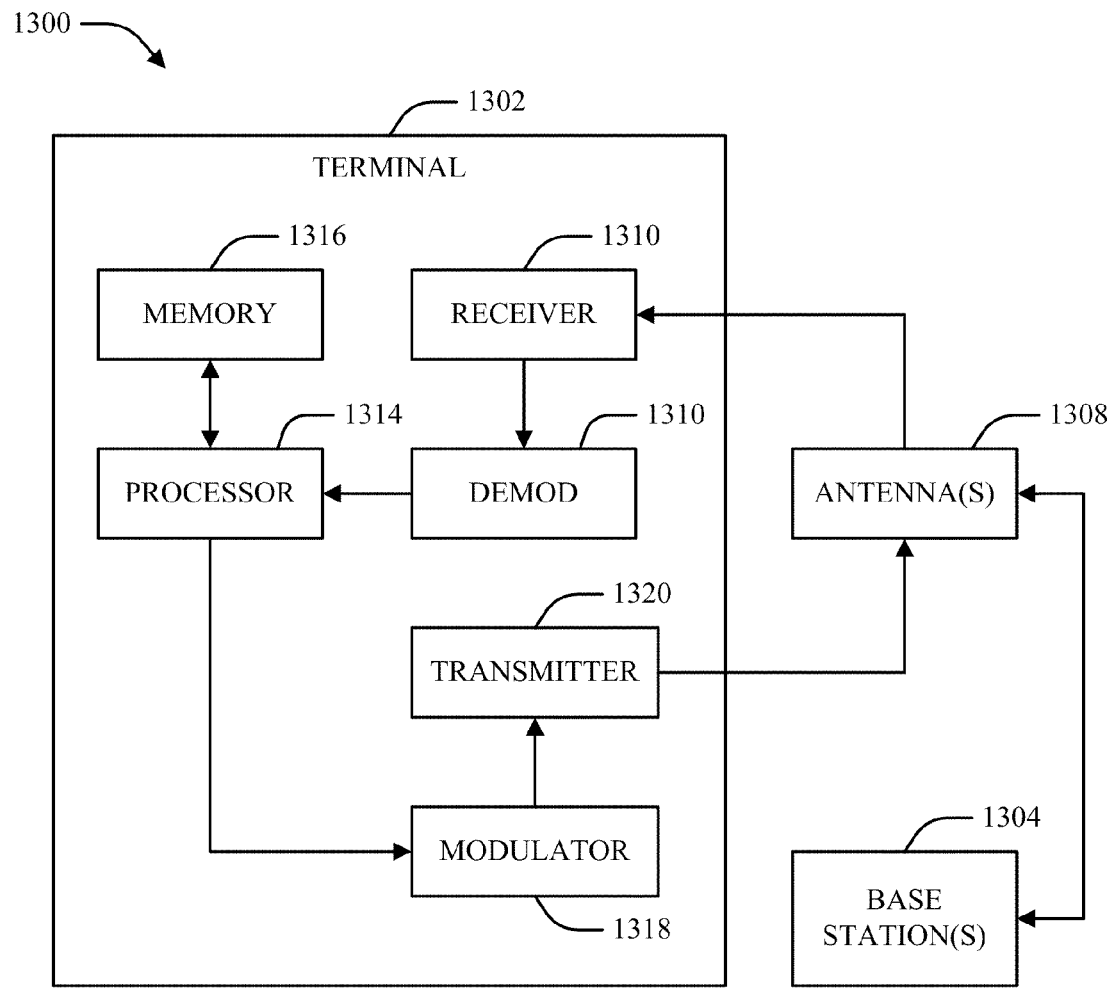
FIGS. 13-14 are block diagrams of respective wireless communication devices that can be utilized to implement various aspects described herein.

FIG. 13 is a block diagram of another system 1300 that can be utilized to implement various aspects of the functionality described herein. In one example, system 1300 includes a mobile terminal 1302. As illustrated, mobile terminal 1302 can receive signal(s) from one or more base stations 1304 and transmit to the one or more base stations 1304 via one or more antennas 1308. Additionally, mobile terminal 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile terminal 1302. Additionally, mobile terminal 1302 can employ processor 1314 to perform methodology 800 and/or other similar and appropriate methodologies. Mobile terminal 1302 can also include a modulator 1318 that can multiplex a signal for transmission by a transmitter 1320 through antenna(s) 1308.

Figure 14:
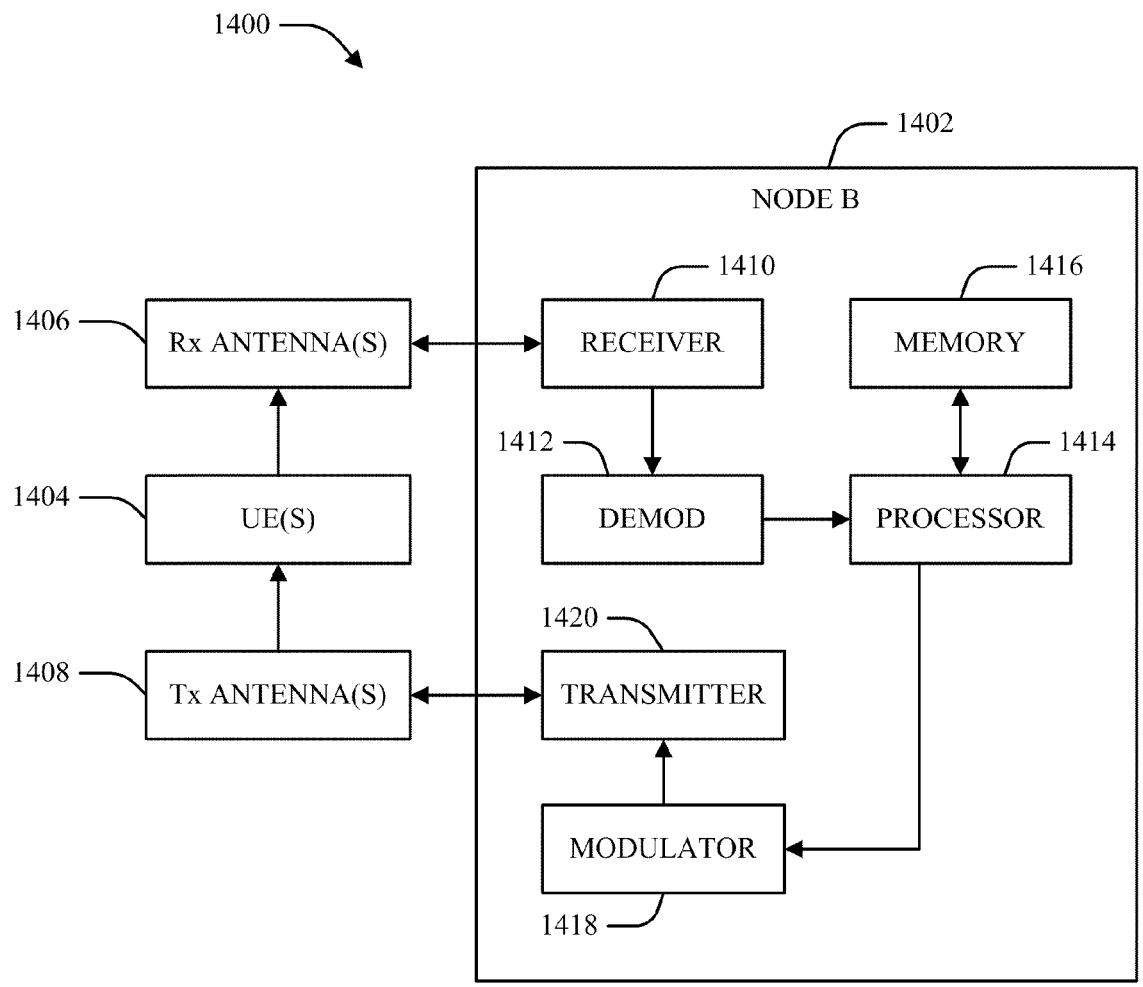

FIG. 14 is a block diagram of a system 1400 that can be utilized to implement various aspects of the functionality described herein. In one example, system 1400 includes a base station or Node B 1402. As illustrated, Node B 1402 can receive signal(s) from one or more UEs 1404 via one or more receive (Rx) antennas 1406 and transmit to the one or more UEs 1404 via one or more transmit (Tx) antennas 1408. Additionally, Node B 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. Additionally, mobile terminal 1302 can employ processor 1314 to perform methodologies 900-1000 and/or other similar and appropriate methodologies. Node B 1402 can also include a modulator 1418 that can multiplex a signal for transmission by a transmitter 1420 through transmit antenna(s) 1408.

Figure 15:
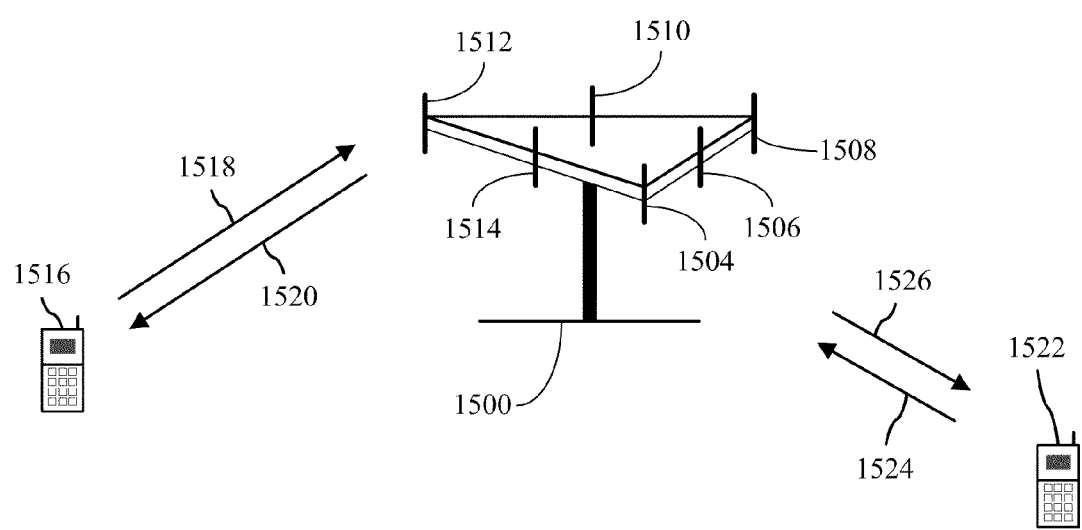
FIG. 15 illustrates a wireless multiple-access communication system in accordance with various aspects set forth herein.

Referring now to FIG. 15, an illustration of a wireless multiple-access communication system is provided in accordance with various aspects. In one example, an access point 1500 (AP) includes multiple antenna groups. As illustrated in FIG. 15, one antenna group can include antennas 1504 and 1506, another can include antennas 1508 and 1510, and another can include antennas 1512 and 1514. While only two antennas are shown in FIG. 15 for each antenna group, it should be appreciated that more or fewer antennas may be utilized for each antenna group. In another example, an access terminal 1516 can be in communication with antennas 1512 and 1514, where antennas 1512 and 1514 transmit information to access terminal 1516 over forward link 1520 and receive information from access terminal 1516 over reverse link 1518. Additionally and/or alternatively, access terminal 1522 can be in communication with antennas 1506 and 1508, where antennas 1506 and 1508 transmit information to access terminal 1522 over forward link 1526 and receive information from access terminal 1522 over reverse link 1524. In a frequency division duplex system, communication links 1518, 1520, 1524 and 1526 can use different frequency for communication. For example, forward link 1520 may use a different frequency then that used by reverse link 1518.

Each group of antennas and/or the area in which they are designed to communicate can be referred to as a sector of the access point. In accordance with one aspect, antenna groups can be designed to communicate to access terminals in a sector of areas covered by access point 1500. In communication over forward links 1520 and 1526, the transmitting antennas of access point 1500 can utilize beamforming in order to improve the signal-to-noise ratio of forward links for the different access terminals 1516 and 1522. Also, an access point using beamforming to transmit to access terminals scattered randomly through its coverage causes less interference to access terminals in neighboring cells than an access point transmitting through a single antenna to all its access terminals.

An access point, e.g., access point 1500, can be a fixed station used for communicating with terminals and can also be referred to as a base station, an eNB, an access network, and/or other suitable terminology. In addition, an access terminal, e.g., an access terminal 1516 or 1522, can also be referred to as a mobile terminal, user equipment, a wireless communication device, a terminal, a wireless terminal, and/or other appropriate terminology.

Figure 16:
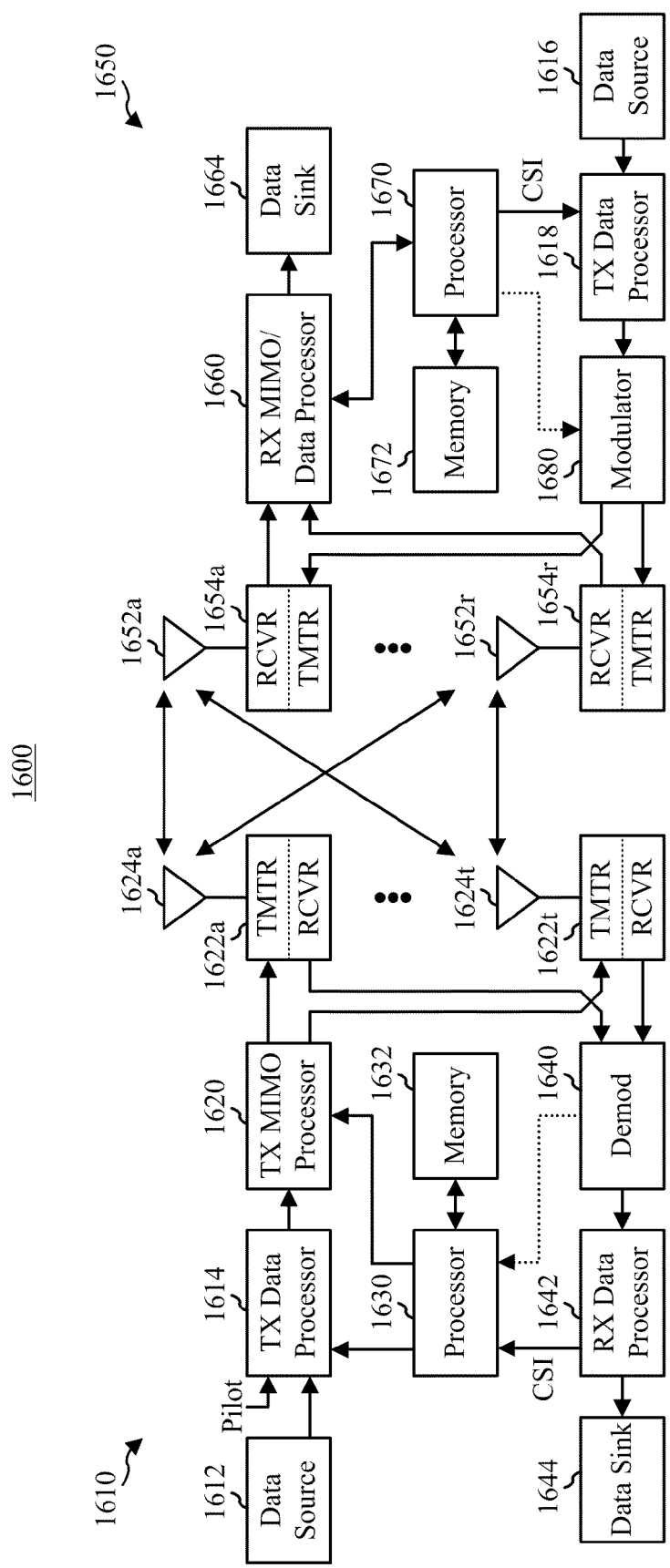
FIG. 16 is a block diagram illustrating an example wireless communication system in which various aspects described herein can function.

Referring now to FIG. 16, a block diagram illustrating an example wireless communication system 1600 in which various aspects described herein can function is provided. In one example, system 1600 is a multiple-input multiple-output (MIMO) system that includes a transmitter system 1610 and a receiver system 1650. It should be appreciated, however, that transmitter system 1610 and/or receiver system 1650 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1610 and/or receiver system 1650 described herein could be utilized in connection with a single output to single input antenna system.

In accordance with one aspect, traffic data for a number of data streams are provided at transmitter system 1610 from a data source 1612 to a transmit (TX) data processor 1614. In one example, each data stream can then be transmitted via a respective transmit antenna 1624. Additionally, TX data processor 1614 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1650 to estimate channel response. Back at transmitter system 1610, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1630.

Next, modulation symbols for all data streams can be provided to a TX MIMO processor 1620, which can further process the modulation symbols (e.g., for OFDM). TX MIMO processor 1620 can then provides $N_T$ modulation symbol streams to $N_T$ transceivers 1622a through 1622t. In one example, each transceiver 1622 can receive and process a respective symbol stream to provide one or more analog signals. Each transceiver 1622 can then further condition (e.g., amplify, filter, and upconvert) the analog signals to provide a modulated signal suitable for transmission over a MIMO channel. Accordingly, $N_T$ modulated signals from transceivers 1622a through 1622t can then be transmitted from $N_T$ antennas 1624a through 1624t, respectively.

In accordance with another aspect, the transmitted modulated signals can be received at receiver system 1650 by $N_R$ antennas 1652a through 1652r. The received signal from each antenna 1652 can then be provided to respective transceivers 1654. In one example, each transceiver 1654 can condition (e.g., filter, amplify, and downconvert) a respective received signal, digitize the conditioned signal to provide samples, and then processes the samples to provide a corresponding "received" symbol stream. An RX MIMO/data processor 1660 can then receive and process the $N_R$ received symbol streams from $N_R$ transceivers 1654 based on a particular receiver processing technique to provide $N_T$ "detected" symbol streams. In one example, each detected symbol stream can include symbols that are estimates of the modulation symbols transmitted for the corresponding data stream. RX processor 1660 can then process each symbol stream at least in part by demodulating, deinterleaving, and decoding each detected symbol stream to recover traffic data for a corresponding data stream. Thus, the processing by RX processor 1660 can be complementary to that performed by TX MIMO processor 1620 and TX data processor 1614 at transmitter system 1610. RX processor 1660 can additionally provide processed symbol streams to a data sink 1664.

In accordance with one aspect, the channel response estimate generated by RX processor 1660 can be used to perform space/time processing at the receiver, adjust power levels, change modulation rates or schemes, and/or other appropriate actions. Additionally, RX processor 1660 can further estimate channel characteristics such as, for example, signal-to-noise-and-interference ratios (SNRs) of the detected symbol streams. RX processor 1660 can then provide estimated channel characteristics to a processor 1670. In one example, RX processor 1660 and/or processor 1670 can further derive an estimate of the "operating" SNR for the system. Processor 1670 can then provide channel state information (CSI), which can comprise information regarding the communication link and/or the received data stream. This information can include, for example, the operating SNR. The CSI can then be processed by a TX data processor 1618, modulated by a modulator 1680, conditioned by transceivers 1654a through 1654r, and transmitted back to transmitter system 1610. In addition, a data source 1616 at receiver system 1650 can provide additional data to be processed by TX data processor 1618.

Back at transmitter system 1610, the modulated signals from receiver system 1650 can then be received by antennas 1624, conditioned by transceivers 1622, demodulated by a demodulator 1640, and processed by a RX data processor 1642 to recover the CSI reported by receiver system 1650. In one example, the reported CSI can then be provided to processor 1630 and used to determine data rates as well as coding and modulation schemes to be used for one or more data streams. The determined coding and modulation schemes can then be provided to transceivers 1622 for quantization and/or use in later transmissions to receiver system 1650. Additionally and/or alternatively, the reported CSI can be used by processor 1630 to generate various controls for TX data processor 1614 and TX MIMO processor 1620. In another example, CSI and/or other information processed by RX data processor 1642 can be provided to a data sink 1644.

In one example, processor 1630 at transmitter system 1610 and processor 1670 at receiver system 1650 direct operation at their respective systems. Additionally, memory 1632 at transmitter system 1610 and memory 1672 at receiver system 1650 can provide storage for program codes and data used by processors 1630 and 1670, respectively. Further, at receiver system 1650, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving per-stream coding rates, each of which corresponds to a respective data stream, and per-layer modulation schemes, each of which corresponds to a respective spatial layer, from an associated network;
   identifying multiple outgoing data streams and a set of spatial layers configured for communicating the multiple outgoing data streams;
   encoding the multiple outgoing data streams based on the respective per-stream coding rates associated with the multiple outgoing data streams, thereby obtaining multiple encoded data streams;
   mapping the multiple encoded data streams to respective spatial layers in the set of spatial layers, thereby obtaining a set of layer-mapped data streams; and
   modulating the set of layer-mapped data streams based on the per-layer modulation schemes that correspond to the respective spatial layers.

2. The method of claim 1, wherein the set of spatial layers corresponds to respective associated antennas.

3. The method of claim 1, wherein the set of spatial layers corresponds to respective beams defined across a plurality of associated antennas.

4. The method of claim 1, wherein the receiving comprises receiving the respective per-stream coding rates and the respective per-layer modulation schemes in an uplink grant message from the associated network.

5. The method of claim 1, wherein the receiving comprises receiving modulation and coding scheme (MCS) information corresponding to per-stream coding rates for at least one outgoing data stream and per-layer modulation schemes for at least one spatial layer in the set of spatial layers.

6. The method of claim 1, wherein the receiving comprises receiving a modulation scheme for at least one specified spatial layer in the set of spatial layers and relative modulation scheme information for remaining spatial layers in the set of spatial layers.

7. The method of claim 6, wherein the relative modulation scheme information comprises respective 1-bit parameters.

8. The method of claim 7, wherein the respective 1-bit parameters indicate a modulation order selected from the group consisting of a modulation order for at least one specified spatial layer in the set of spatial layers or a modulation order of a predetermined degree smaller than the modulation order for at least one specified spatial layer in the set of spatial layers.

9. The method of claim 1, wherein the receiving comprises receiving a coding rate for at least one specified outgoing data stream and relative coding rate information for remaining outgoing data streams.

10. The method of claim 1, wherein the multiple outgoing data streams correspond to a single codeword transmission scheme.

11. The method of claim 1, wherein the multiple outgoing data streams correspond to a multi-codeword transmission scheme.

12. A wireless communications apparatus, comprising:
a memory that stores data relating to multiple outgoing data streams and a set of spatial layers configured for communicating the multiple outgoing data streams; and
a processor configured to:
receive per-stream coding rates, each of which corresponds to a respective outgoing data stream, and per-layer modulation schemes, each of which corresponds to a respective spatial layer, from an associated network,
encode the multiple outgoing data streams based on the respective per-stream coding rates associated with the outgoing data streams to obtain multiple encoded data streams,
map the multiple encoded data streams to respective spatial layers in the set of spatial layers to obtain a set of layer-mapped data streams, and
modulate the set of layer-mapped data streams based on the per-layer modulation schemes that correspond to the respective spatial layers.

13. The wireless communications apparatus of claim 12, wherein the set of spatial layers corresponds to at least one of respective associated antennas or respective beams defined across a plurality of associated antennas.

14. The wireless communications apparatus of claim 12, wherein the processor is further configured to receive modulation and coding scheme (MCS) information corresponding to per-stream coding rates for at least one outgoing data stream and per-layer modulation schemes for at least one spatial layer in the set of spatial layers.

15. The wireless communications apparatus of claim 12, wherein the processor is further configured to receive a modulation scheme for at least one specified spatial layer in the set of spatial layers and relative modulation scheme information for remaining spatial layers in the set of spatial layers.

16. The wireless communications apparatus of claim 12, wherein the processor is further configured to receive a coding rate for at least one specified outgoing data stream and relative coding rate information for remaining outgoing data streams.

17. An apparatus, comprising:
means for receiving per-stream code rate parameters, each of which corresponds to a respective data stream, and per-layer modulation parameters, each of which corresponds to a respective spatial layer, from an associated network;
means for encoding data streams based on corresponding per-stream code rate parameters associated with the data streams to obtain respective encoded data streams;
means for mapping the respective encoded data streams to a set of spatial layers to obtain respective layer-mapped data streams; and
means for modulating the layer-mapped data streams based on corresponding per-layer modulation parameters.

18. The apparatus of claim 17, wherein the means for receiving comprises means for receiving the per-stream code rate parameters and the per-layer modulation parameters in an uplink grant message from the associated network.

19. The apparatus of claim 17, wherein the means for receiving comprises means for receiving modulation and coding scheme (MCS) information corresponding to per-stream code rate parameters for at least one data stream and per-layer modulation parameters for at least one spatial layer.

20. The apparatus of claim 17, wherein the means for receiving comprises means for receiving a modulation parameter for at least one specified spatial layer and relative modulation parameters for respective spatial layers disparate from the specified spatial layer.

21. The apparatus of claim 17, wherein the means for receiving comprises means for receiving a code rate parameter for at least one specified data stream and relative code rate parameters for respective remaining data streams.

22. A computer program product, comprising:
a non-transitory computer-readable medium, comprising:
code for causing a computer to receive per-stream code rate parameters, each of which corresponds to a respective data stream, and per-layer modulation parameters, each of which corresponds to a respective spatial layer, from an associated network;
code for causing a computer to encode data streams based on corresponding per-stream code rate parameters associated with the data streams to obtain respective encoded data streams;
code for causing a computer to map the respective encoded data streams to a set of spatial layers to obtain respective layer-mapped data streams; and
code for causing a computer to modulate the layer-mapped data streams based on corresponding per-layer modulation parameters.

23. The computer program product of claim 22, wherein the code for causing a computer to receive comprises code for causing a computer to receive the per-stream code rate parameters and the per-layer modulation parameters in an uplink grant message from the associated network.

24. The computer program product of claim 22, wherein the code for causing a computer to receive comprises code for causing a computer to receive modulation and coding scheme (MCS) information corresponding to per-stream code rate parameters for at least one data stream and per-layer modulation parameters for at least one spatial layer.

25. The computer program product of claim 22, wherein the code for causing a computer to receive comprises code for causing a computer to receive a modulation parameter for at least one specified spatial layer and relative modulation parameters for respective spatial layers disparate from the specified spatial layer.

26. The computer program product of claim 22, wherein the code for causing a computer to receive comprises code for causing a computer to receive a code rate parameter for at least one specified data stream and relative code rate parameters for respective remaining data streams.

27. A method, comprising:
identifying an associated network device, multiple codewords associated with a communication scheme utilized by the associated network device, and respective spatial layers employed by the associated network device;
defining per-layer modulation parameters, each of which corresponds to a respective spatial layer, and per-codeword code rate parameters, each of which corresponds to a respective codeword, the per-layer modulation parameters and the per-codeword code rate parameters corresponding to the associated network device; and
signaling the per-layer modulation parameters and the per-codeword code rate parameters to the associated network device.

28. The method of claim 27, wherein the respective spatial layers correspond to at least one of respective antennas at the associated network device or beams defined across a plurality of antennas at the associated network device.

29. The method of claim 27, wherein the signaling comprises signaling the respective per-layer modulation parameters and per-codeword code rate parameters in an uplink grant message to the associated network device.

30. The method of claim 27, wherein the signaling comprises signaling modulation and coding scheme (MCS) information comprising per-codeword code rate parameters for at least one codeword associated with the communication scheme utilized by the associated network device and per-layer modulation parameters for at least one spatial layer employed by the associated network device.

31. The method of claim 30, wherein the signaling further comprises signaling supplemental per-layer modulation parameters with the MCS information upon determining that a number of spatial layers employed by the associated network device is greater than a number of codewords associated with the communication scheme utilized by the associated network device.

32. The method of claim 27, wherein the signaling comprises signaling reference modulation parameters indicating a modulation scheme for at least one specified spatial layer employed by the associated network device and relative modulation parameters for respective spatial layers employed by the associated network device disparate from the at least one specified spatial layer.

33. The method of claim 32, wherein the relative modulation parameters comprise respective 1-bit values.

34. The method of claim 33, wherein the respective 1-bit values indicate a modulation order selected from the group consisting of a modulation order for the at least one specified spatial layer employed by the associated network device or a modulation order of a predetermined degree smaller than the modulation order for the at least one specified spatial layer employed by the associated network device.

35. The method of claim 27, wherein the signaling comprises signaling reference code rate parameters for at least one specified codeword associated with the communication scheme utilized by the associated network device and relative code rate parameters for respective codewords associated with the communication scheme utilized by the associated network device disparate from the at least one specified codeword.

36. A wireless communications apparatus, comprising:
a memory that stores data relating to a network device, multiple codewords associated with a communication scheme utilized by the network device, and respective spatial layers employed by the network device; and
a processor configured to define per-layer modulation parameters, each of which corresponds to a respective spatial layer, and per-codeword code rate parameters, each of which corresponds to a respective codeword, the per-layer modulation parameters and the per-codeword code rate parameters corresponding to the network device, and to signal the per-layer modulation parameters and the per-codeword code rate parameters to the network device.

37. The wireless communications apparatus of claim 36, wherein the processor is further configured to signal the respective per-layer modulation parameters and per-codeword code rate parameters in an uplink grant message.

38. The wireless communications apparatus of claim 36, wherein the processor is further configured to signal modulation and coding scheme (MCS) information comprising per-codeword code rate parameters for at least one codeword associated with the communication scheme utilized by the network device and per-layer modulation parameters for at least one spatial layer employed by the network device.

39. The wireless communications apparatus of claim 38, wherein the processor is further configured to signal supplemental per-layer modulation parameters with the MCS information upon determining that a number of spatial layers employed by the network device is greater than a number of codewords associated with the communication scheme utilized by the network device.

40. The wireless communications apparatus of claim 36, wherein the processor is further configured to signal reference modulation parameters indicating a modulation scheme for at least one specified spatial layer employed by the network device and relative modulation parameters for respective spatial layers employed by the network device disparate from the at least one specified spatial layer.

41. The wireless communications apparatus of claim 36, wherein the processor is further configured to signal reference code rate parameters for at least one specified codeword associated with the communication scheme utilized by the network device and relative code rate parameters for respective codewords associated with the communication scheme utilized by the network device disparate from the at least one specified codeword.

42. An apparatus, comprising:
means for defining a set of per-layer modulation parameters, each of which corresponds to a respective spatial layer, and a set of per-codeword coding rate parameters, each of which corresponds to a respective codeword, the per-layer modulation parameters and the per-codeword coding rate parameters being defined for a designated network device; and
means for signaling the set of per-layer modulation parameters and the set of per-codeword coding rate parameters to the designated network device.

43. The apparatus of claim 42, wherein the means for signaling comprises means for signaling modulation and coding scheme (MCS) information comprising per-codeword coding rate parameters for at least one codeword utilized by the designated network device and per-layer modulation parameters for at least one spatial layer employed by the designated network device.

44. The apparatus of claim 43, wherein the means for signaling comprises means for signaling supplemental per-layer modulation parameters with the MCS information upon determining that a number of spatial layers employed by the designated network device is greater than a number of codewords utilized by the designated network device.

45. The apparatus of claim 43, wherein the means for signaling comprises means for signaling reference modulation parameters indicating a modulation scheme for at least one specified spatial layer employed by the designated network device and relative modulation parameters for respective spatial layers employed by the designated network device disparate from the at least one specified spatial layer.

46. The apparatus of claim 43, wherein the means for signaling comprises means for signaling reference coding rate parameters for at least one specified codeword utilized by the designated network device and relative coding rate parameters for respective codewords utilized by the designated network device disparate from the at least one specified codeword.

47. A computer program product, comprising:
a non-transitory computer-readable medium, comprising:
code for causing a computer to define a set of per-layer modulation parameters, each of which corresponds to a respective spatial layer, and a set of per-codeword coding rate parameters, each of which corresponds to a respective codeword, the per-layer modulation parameters and the per-codeword coding rate parameters being defined for a designated network device; and
code for causing a computer to signal the set of per-layer modulation parameters and the set of per-codeword coding rate parameters to the designated network device.

48. The computer program product of claim 47, wherein the code for causing a computer to signal comprises code for causing a computer to signal modulation and coding scheme (MCS) information comprising per-codeword coding rate parameters for at least one codeword utilized by the designated network device and per-layer modulation parameters for at least one spatial layer employed by the designated network device.

49. The computer program product of claim 47, wherein the code for causing a computer to signal comprises code for causing a computer to signal reference modulation parameters indicating a modulation scheme for at least one specified spatial layer employed by the designated network device and relative modulation parameters for respective spatial layers employed by the designated network device disparate from the at least one specified spatial layer.

50. The computer program product of claim 47, wherein the code for causing a computer to signal comprises code for causing a computer to signal reference coding rate parameters for at least one specified codeword utilized by the designated network device and relative coding rate parameters for respective codewords utilized by the designated network device disparate from the at least one specified codeword.

* * * * *